US012582043B2

(12) United States Patent
Sullivan

(10) Patent No.: US 12,582,043 B2
(45) Date of Patent: Mar. 24, 2026

(54) CENTRIFUGAL ORBITAL FLOWER CUTTER WITH AN IRIS BLADE FOLLOWER

(71) Applicant: John Timothy Sullivan, Marriottsville, MD (US)

(72) Inventor: John Timothy Sullivan, Marriottsville, MD (US)

(73) Assignee: MARJO ENGINEERING, LLC, Marriottsville, MD (US)

( * ) Notice: Subject to any disclaimer, the term of this patent is extended or adjusted under 35 U.S.C. 154(b) by 549 days.

(21) Appl. No.: 18/155,796

(22) Filed: Jan. 18, 2023

(65) Prior Publication Data

US 2023/0225249 A1     Jul. 20, 2023

Related U.S. Application Data

(60) Provisional application No. 63/361,730, filed on Jan. 18, 2022.

(51) Int. Cl.
*A01D 45/06*      (2006.01)
*A23N 15/00*      (2006.01)
*A01G 3/00*       (2006.01)

(52) U.S. Cl.
CPC ........... *A01D 45/065* (2013.01); *A23N 15/00* (2013.01); *A01G 3/00* (2013.01)

(58) Field of Classification Search
CPC ...... A01D 45/00–45/30; A01D 45/065; A23N 15/01; A23N 15/00; A01G 2003/005; A24B 5/00–5/16
See application file for complete search history.

(56) References Cited

U.S. PATENT DOCUMENTS

| | | | | |
|---|---|---|---|---|
| 2,303,908 A | * | 12/1942 | Brashear ................. | A24B 5/06 131/314 |
| 2,739,846 A | * | 3/1956 | Jacobsen ................ | A01D 87/10 406/96 |
| 3,410,272 A | * | 11/1968 | Van Den Hemel .... | A23N 15/01 460/135 |
| 4,022,220 A | * | 5/1977 | Alkemade .............. | A23N 15/01 460/136 |
| 4,151,847 A | * | 5/1979 | van Donkelaar ...... | A23N 15/01 460/135 |
| 4,498,484 A | * | 2/1985 | Gilbert ................... | A01D 45/16 460/136 |

(Continued)

FOREIGN PATENT DOCUMENTS

| EP | 0501544 A1 | * | 9/1992 | ............. | A23N 15/01 |
|---|---|---|---|---|---|
| EP | 3824744 A1 | * | 5/2021 | ............. | A23N 15/01 |
| GB | 2071999 A | * | 9/1981 | ............. | A23N 15/01 |

*Primary Examiner* — Joseph M Rocca
*Assistant Examiner* — Madeline I Runco
(74) *Attorney, Agent, or Firm* — BACON&THOMAS, PLLC

(57)               ABSTRACT

A harvester for removing cannabis flower from stalks includes a blade follower iris that adjusts the size of the flower-stripping opening to correspond to the diameter of the stalk. The size of the opening may be controlled by centrifugal and spring forces that cause the iris to open and close. In addition, an improved stalk-pulling belt drive conveyor system utilizes two relatively floating, releasably coupled belt systems to pinch and pull the stalk through the blade follower iris.

13 Claims, 13 Drawing Sheets

(56) References Cited

U.S. PATENT DOCUMENTS

| | | | | |
|---|---|---|---|---|
| 4,638,705 | A * | 1/1987 | Michel | A01G 2/35 |
| | | | | 144/24.13 |
| 5,041,057 | A * | 8/1991 | Felstehausen | A01F 11/06 |
| | | | | 460/57 |
| 5,331,980 | A * | 7/1994 | Bailey | A01D 45/16 |
| | | | | 460/134 |
| 10,624,384 | B2 * | 4/2020 | Evans | A24B 5/12 |
| 12,004,550 | B2 * | 6/2024 | Jasiewicz | A23N 15/02 |
| 2010/0216114 | A1 * | 8/2010 | Friedhoff | G01N 21/85 |
| | | | | 435/287.1 |
| 2018/0077866 | A1 * | 3/2018 | Perez | A01D 25/04 |
| 2020/0260649 | A1 * | 8/2020 | Olson | A01D 46/02 |
| 2021/0130105 | A1 * | 5/2021 | Schwarze | B65G 45/16 |
| 2021/0169119 | A1 * | 6/2021 | Jasiewicz | A01D 46/28 |
| 2021/0378181 | A1 * | 12/2021 | Mosman | A01G 3/085 |
| 2022/0211093 | A1 * | 7/2022 | Bouchier | A24B 5/06 |

* cited by examiner

CENTRIFUGAL ORBITAL FLOWER CUTTER WITH AN IRIS BLADE FOLLOWER

CROSS-REFERENCE TO RELATED APPLICATIONS

This application claims the benefit of U.S. Provisional Patent Appl. Ser. No. 63/361,730, filed Jan. 18, 2022.

BACKGROUND OF THE INVENTION

1. Field of the Invention

This invention relates to an apparatus removing for cannabis flowers from the stem, stalk, or branches (hereinafter referred to as the "stalk" of a cannabis plant. The apparatus of the invention eliminates disadvantages of a conventional bucking machine, including the need for an operator to match the stalk to select an appropriately sized hole in the bucking machine.

2. Description of Related Art

The process of removing cannabis flowers from the stalk is very labor-intensive. The flower removal process requires the operator to cut the flowers from the stem, stalk, or branch using hand labor scissors or something called a bucking machine.

The conventional bucking machine consists of a metal, wood, or plastic plate with several different holes in the plate. The operator must look at the stalk in their hand and try to match the diameter of the stalk to the hole size that is the closest match to the stalk diameter. The stalk is then pulled through the hole by two rubber drive wheels that frictionally engage the stalk, causing the flower to be stripped from the stalk as it pulled through the selected hole.

The need for hole size matching has the disadvantage that it is time-consuming and requires a great deal of skill and concentration on the part of the operator. If the hole is too small, the stalk will not fit in the hole and the flower cannot be removed, but If the operator places a small stalk in a large hole, the flower will be pulled through the hole with the stalk and be destroyed.

In addition, conventional bucking machines have the disadvantage that the use of two rubber drive wheels to pull the stalk through the fixed diameter holes destroys the natural shape of the flower, reducing the go-to-market value of the flower. Moreover, the biomass removed by pulling the stalk through the hole leaves a sticky residue on the rollers that is difficult to remove, exacerbating the problem that the pinch point where the rollers deform under compression exerts a drag on rotation that requires a lot of energy to overcome. If the stalk is too large in diameter, the gear that rotates the drive wheels will stall, so that the operator must put the motor in reverse to unclog the stalk jammed between the rollers, causing delays in the flower removal process.

The problems of compressing, snatching, ripping, and tearing the flower from the stalk with an improperly sized hole, damage to the shape of the flower even when the hole is properly sized, removal of sticky residue, and clogging of the machine dues to jamming of stalks during flower removal, have not been solved until now.

SUMMARY OF THE INVENTION

It is accordingly a first objective of the invention to provide an apparatus that overcomes the disadvantages of conventional cannabis-flower-removing bucking machines or harvesters without the need for additional labor, by providing a bucking machine in which the stalk stripping opening by an iris blade follower mechanism that automatically matches hole size to stalk diameter, so that the stalk is pulled through the machine and the flower removed without destroying or affecting the natural shape of the flower.

Additional objectives of the invention include (i) provision of a cannabis flower removing apparatus that is convenient to operate and maintain, (ii) reduction in clogging and build-up of sticky residue on the stalk pulling mechanism to avoid the need for frequent reversals of the stalk pulling mechanism and delays in the flower removal process, (iii) provision for easy tool-free disassembly for cleaning, and/or (iv) enabling adjustments to compensate for wear and tear.

These and other objectives of the invention are achieved by providing a harvester in which the stalk-stripping mechanism includes an iris consisting of centrifugal spring-loaded cutting blades that form an opening whose size increases in response to a spring force when the cutting blade assembly is rotated at a slow speed or when the rotation is stopped, and whose size decreases at high rotation speeds as centrifugal forces overcome the spring force. The centrifugal force that opens and closes the blades can be adjusted by adjusting the rotation speeds and depends on fixed or adjustable weights included in the cutting blade assembly. The size of the opening depends on the relative position of cutting or stripping edges of the two cutting blades, which in an exemplary embodiment of the invention are the edges of overlapping holes in the two plates, the degree of overlap changing with the centrifugal force on the plates to vary the size of the hole.

In the exemplary embodiment, each plate has a hole and the opening changes from round to oval as the plates are moved to a closed position in response to increasing rotation speed, although it will be appreciated that an iris effect can also be achieved with an arrangement in which one of the plates has a hole and the other plate has a corresponding curved edge that overlaps the hole. The hole(s) may optionally be serrated or undercut to increase a sharpness of the edges.

The plates are preferably coupled to a rotating, motor-driven hub by bearings that allow relative pivoting of the plates during rotation in response to the centrifugal forces caused the by rotation, which movement stops limiting the pivoting movement at high rotation speeds. The movement stops may be defined by guide slots in the plates and corresponding posts in the rotating hub.

As the centrifugal forces resulting from rotation of the cutting mechanism overcome the spring tension, the pair of pivotal plates move outward in opposite directions to cause edges of the opening to move inwardly and form an ellipse of increasing eccentricity that pinches the stalk surface 180 degrees apart. The use of bearing followers to achieve the rotation and pivoting prevents the countersink rotation plate or cutting blades from cutting into the stalk, while achieving a chisel effect at the flower's apex where it is joined to the branch. As a result, the countersink rotating plate or cutting blades will only cut flowers and branches projecting outward from the surface of the stalk, in a manner similar to a razor blade trimming facial hair without cutting the skin. Pivoting of the countersink rotating plate or movement of the spring-loaded cutting blade holder in a reverse direction under either compression or extension spring forces returns the iris stem follower aperture formed by the overlapping holes to an open position when the rotational speed of the motor is lowered Because the countersink rotating plate or opposing branch followers are provided on a bearing follower to float as they pinch 180 degrees of the stalk in rotation, the ellipse shaped pinch hole is allowed to constantly adjust with the continually changing shape and thickness of the branch as it is being pulled through the cutter assembly. The amount of pinch friction applied to the stalk can be adjusted by adjusting motor rotation speeds, the weight of plate or blade mounting weight, or compression or extension spring loading.

In addition to the above described cutting mechanism, the exemplary embodiments of the invention provide for a timing belt or conveyor belt drive system that is used to pull the stalk through the stalk stripping opening and into the harvester. The drive system employs two or more adjustable turnbuckles to adjust the tension of individual drive belts and a third adjustable turnbuckle that applies a spring-loaded force tension between timing or conveyor belts and a drive pull belt. A floating bearing assembly moves up and down in linear slots of the belts while applying spring-loaded forces between the two belts with one of the belts being fixed in a position. The other drive belt floats between the two drive pull belts to pull a branch, or both belts float in a linear bearing track with spring tension on both sides to pinch a stalk and drag the biomass into the cutter assembly.

The stalk pulling conveyor belts have a bearing system with a male and female cavity to allow the top or bottom belt to move while one belt is fixed. A wiper is placed between the two belts to prevent debris from getting caught between the sidetracks of the belts to prevent a clog. The wiper can be a mating male and female cavity or a fixed strip of a plastic or metal strip. A toggle spring loaded tension on either side of the two belts to creates a force on the stalk being pulled by the two drive belts that are controlled by a speed controller. The cutting assembly is mounted on a door with a hinge that allows access to the belts that operate inside of the rotating cutting assembly.

The speed of the rotating blades can be controlled with an electrical input to control predetermined or variable speed controls by adjusting the belt or roller pull speeds relative to the rotating speeds of the cutter to optimized the cut of the flower without snatching the flower from the stem. The electrical input to control cutting blade rotation can be provided by a foot switch, optical sensor or mechanical sensor that communicates with the motor controller. The motor the drives the cutter can be a belt driven motor or hub-less motor with a hollow shaft. The conveyor pull belts are extended through the bearing assembly or hub-less motor to minimize the length of the stem needed to engage with the stem to pull it through the cutters. In addition, the rotation of the cutting plates or blades can be controlled by a loadcell on the bearing assembly, or an on/off timer that spins the cutting blades at a predetermined amount of time after the presence of a stalk is sensed, before the blades open again by stopping rotation or slowing the cutting mechanism rotation speed.

In order to compensate for stretching and position changes in the drive belt over time due to wear and abuse, the cutter rotating assembly may be mounted on a leadscrew stage to adjust the gap between the input of the cutter housing and the drive belts as they stretch and change position.

In addition, in order to facilitate cleaning and unclogging of the cutter assembly, the drive system of the exemplary embodiment may be taken apart without tools. The drive system is assembled using three adjustable toggle clamps, two of which take the slack adjustment out of the top and bottom motor driven belt pulleys. A third toggle clamp is used to apply a spring-loaded compression force between a fixed bottom belt drive assembly and the floating top belt drive assembly. The top belt floats on four roller bearings in a mating slot allowing the top spring-loaded to move up and down to accommodate the different stalk sizes. Each belt is driven by two different motors or a chain of pulley systems that uses one motor. One electrical resistive trip pot may be provided to synchronously control the exact motor speed of both motors. When all three toggle clamps are released, the two drive pull belts are easily removed for cleaning or replacement.

Cleaning and service may be further facilitated by arranging the system's front door on hinges to open the cabinet. Safety interlocks turn the motors off when any of the doors are opened.

Finally, in a second exemplary embodiment of the invention, the pivoting cutting blades of plates of the first exemplary embodiment may be replaced by a predetermined stacked weighted cutter having spring loaded return arms with wheels to reduce friction. In this embodiment, the stacked weights produce enough centrifugal forces to compress a return spring (not shown) when the cutting housing not shown is spinning.

DETAILED DESCRIPTION OF PREFERRED EMBODIMENTS

Figures 1, 2:
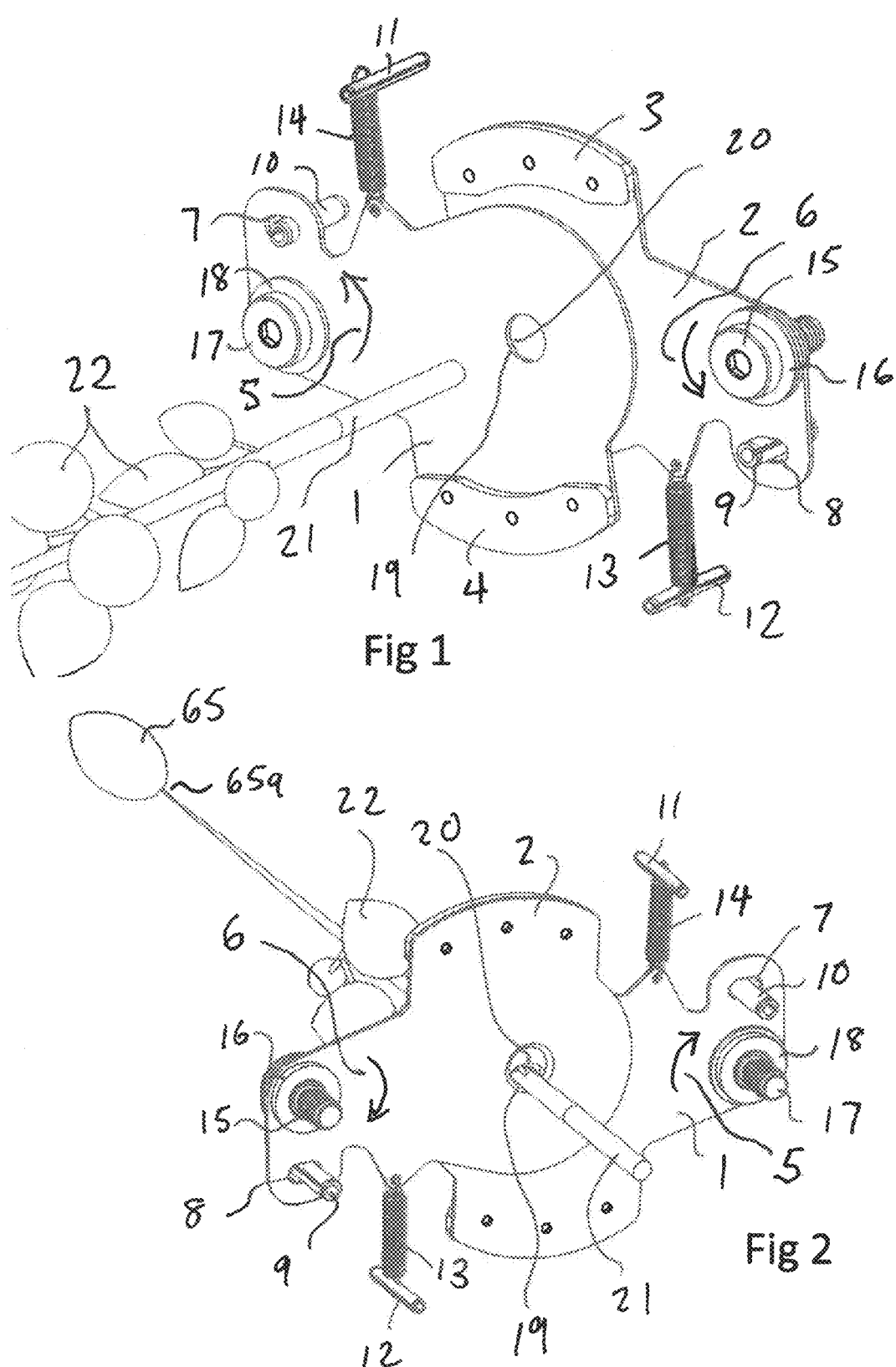
FIG. 1 is an isometric front view of cutting blade assembly according to a first exemplary embodiment of the invention.
FIG. 2 is an isometric rear view of the cutting blade assembly of FIG. 1 as a stalk is being pulled through the cutting assembly.

FIGS. 1-7 show the cutting assembly of a harvester for removing cannabis flowers and leaves from a stalk, stem, or branch in accordance with the principles of a first exemplary embodiment of the invention. The cutting assembly includes two centrifugal cutting plates or blades 1,2, each including a respective weight 3,4 and circular cutting hole 19,20. As shown in FIG. 1, the cutting holes are aligned to form a circular opening for receiving a stalk 21, while FIG. 2 shows that the cutting blades 1,2 have moved apart as a result of centrifugal force, applied in the manner described below, so that the circular holes 19,20 in the respective cutting blades 1,2 are offset and their intersection forms a reduced-size elliptical opening or aperture whose minor axis corresponds to a diameter of the stalk 21.

Figures 3, 4:
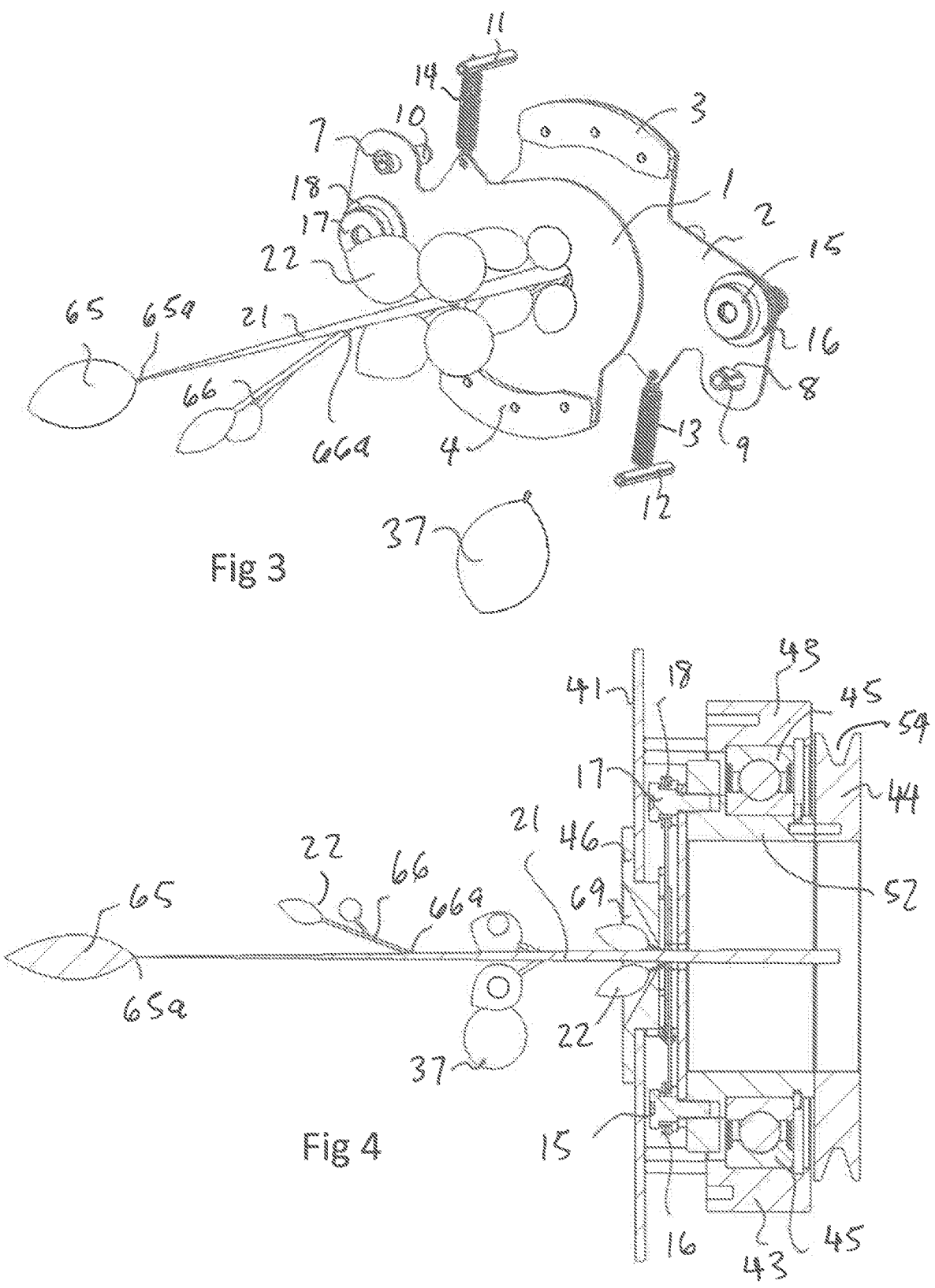
FIG. 3 Is n isometric front view of the cutting blade assembly of FIGS. 1 and 2 as the stalk is pulled through the cutting assembly.
FIG. 4 Is a cut-way side view of flowers and stem 40 being inserted the cutting assembly of FIGS. 1-3.

Each cutting blade 1,2 includes bearings 16,18 for receiving bearing posts 15,17 fixed to a rotatable hub 52 such that rotational motion of the hub is transmitted to through the bearing posts 15,17 to the cutting blades 1,2 to enable the entire cutting assembly to rotate about a central axis of the cutting assembly. As illustrated in FIG. 4, the rotating hub 52 is fixed to and rotated by a pulley 44 having a belt groove 54. The centrifugal rotating cutting blades 1,2 are spring loaded by springs 13,14 attached at one end to the respective cutting blades 1,2 and at the other end to posts 11,12 that are fixed to the rotating hub assembly. Cutting blades 1,2 further include slots 7,8 through which posts 9,10 connected to the hub 52 extend to respectively guide pivoting of the cutting blades 1,2 relative to the hub in directions 5,6 as the entire cutting assembly is rotated. As explained below, pivoting of the cutting blades 1,2 relative to the rotating hub is the result of a spring force that causes the cutting blades 1,2 to pivot about the bearing posts 15,17 in a direction that increases the size of the stalk stripping opening or iris formed by the intersection of cutting holes 19,20, and a centrifugal force the causes the cutting blades 1,2 to move in a direction that decreases the size of the stalk stripping opening.

As illustrated in FIGS. 1-3, the stem 21 of flowers (and/or leaves) 22 being cut is inserted into an opening that is formed by overlapping holes 19,20 when cutting blade 1 is pivoted in a counterclockwise direction, as viewed in FIG. 1 from the front of the cutting assembly, and cutting blade 2 is pivoted in a clockwise direction as viewed in FIG. 1. It will be appreciated that a corresponding iris effect could also be achieved by just pivoting one of the cutting blades 1, 2, while the other of the cutting blades 1,2 is fixed relative to the rotating hub. Pivoting to the open position results from the action of springs 13,14, which overcome the reduced or zero centrifugal force at lower rotating speeds or when the motor that applies the centrifugal force is stopped. When the rotating speeds are increased, the centrifugal forces on weights 3,4 overcome the spring tension provided by springs 13,14, causing the blades 1,2 to move in an opposite direction to reduce the size of the opening around the stem, so that the opening is closed on the stem 21 as shown in FIG. 2 and the flowers or leaves 37 are cut off a section 37*a* of the stem 21, as shown in FIG. 3, by the edges of respective holes 19,20 as the stem 21 is pushed into the opening by an operator (not shown). The edges of one or both of the respective holes 19,20 may optionally be countersunk to produce a sharper cutting edge. Irrespective of whether a sharper edge is provided, the cutting blades use a chisel effect to strip the flowers 22 from the stalk 21.

Figures 13, 14:
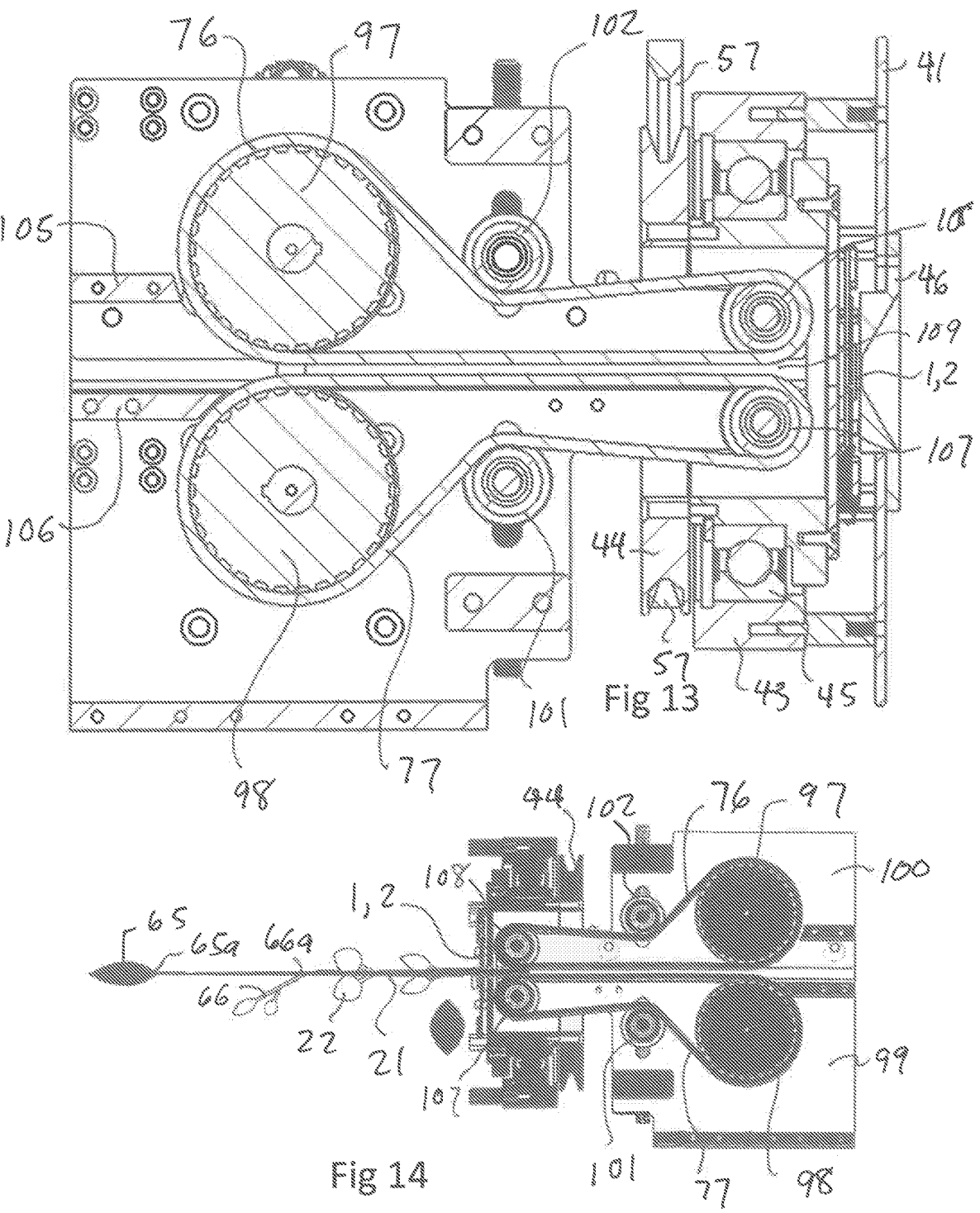
FIG. 13 is a cut away top view of an adjustable drive belt assembly with belt discharge wipers according to the first exemplary embodiment of the invention.
FIG. 14 is a top view of a stem 113 and cut flower 114 being moved by the drive belt assembly of FIG. 13.

FIGS. 4-7 illustrate a housing for the blade assembly including the overlapping The stalk 21 with flowers is inserted into a stationary cutting blades 1,2 shown in FIGS. 1-3. funnel 46 mounted on a stationary plate 41, and into the stalk-stripping opening or iris formed by overlapping holes 19,20 in the cutting blades 1,2. After being stripped by the stalk stripping opening or iris, the stripped stalk 21 passes through an opening in rotating mounting plate 52*a*, which is fixed to and rotatable with the hub 52, and then passes into the hollow interior of hub 52, into which a stalk-pulling dual belt system extends, as illustrated in FIGS. 8, 13, and 14. Bearing posts 15,17 extend from and rotate with the rotating mounting plate 52*a*. The hub 52 is rotatably mounted to a fixed housing 43 of the cutting assembly by bearings 45. The entire assembly, including the rotating hub 52 is rotated by the drive pulley 44, which includes a Vee cut slot 54 for a drive belt 57, illustrated in FIG. 8. The pulley 44 has a pass-through hole 53 for the dual drive stalk-pulling belting, described below.

Figures 17, 18:
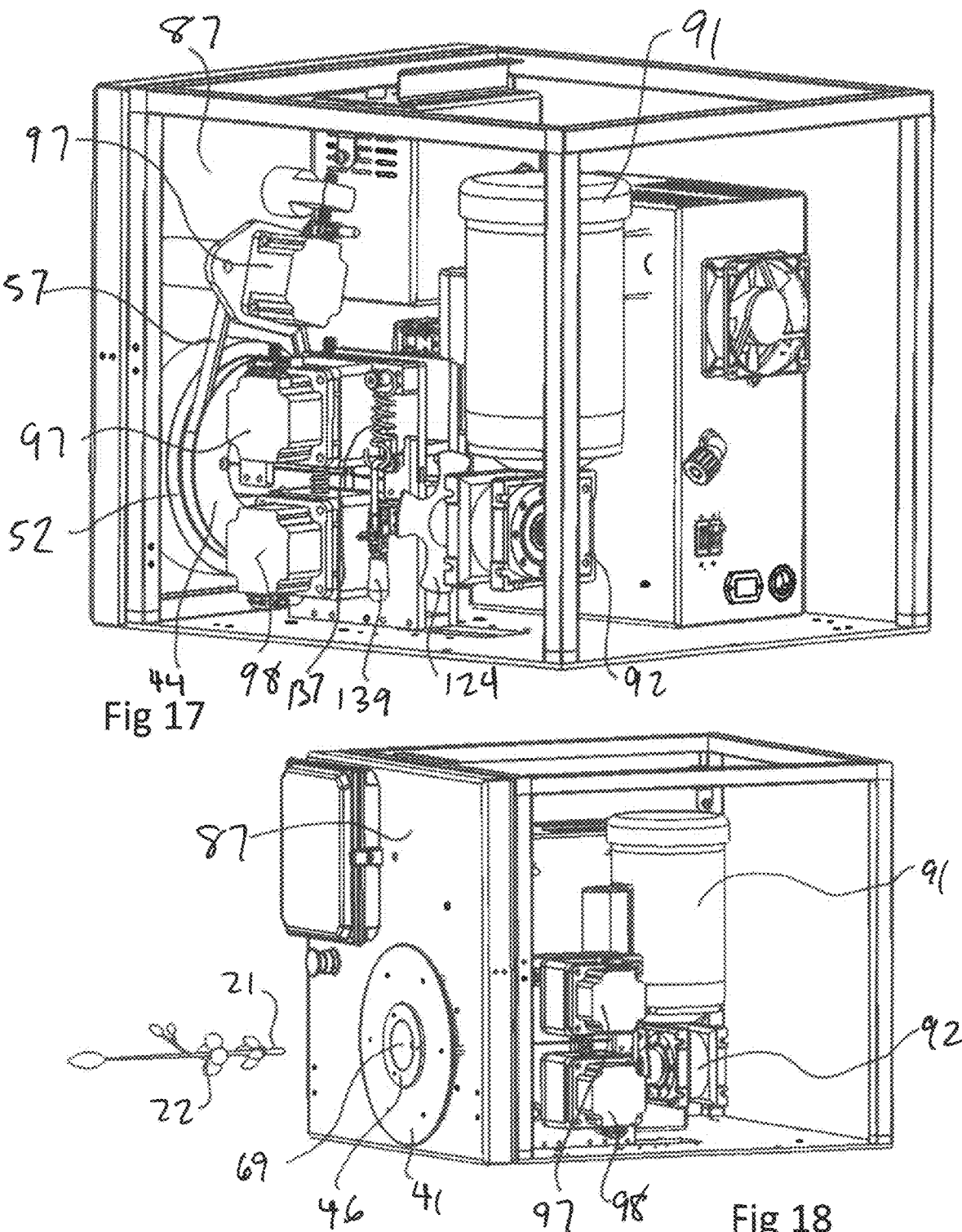
FIG. 17 is an isometric rear view of the flower harvester of the first exemplary embodiment.
FIG. 18 is another isometric side view of the flower harvester of the first exemplary embodiment.
Figures 19, 20:
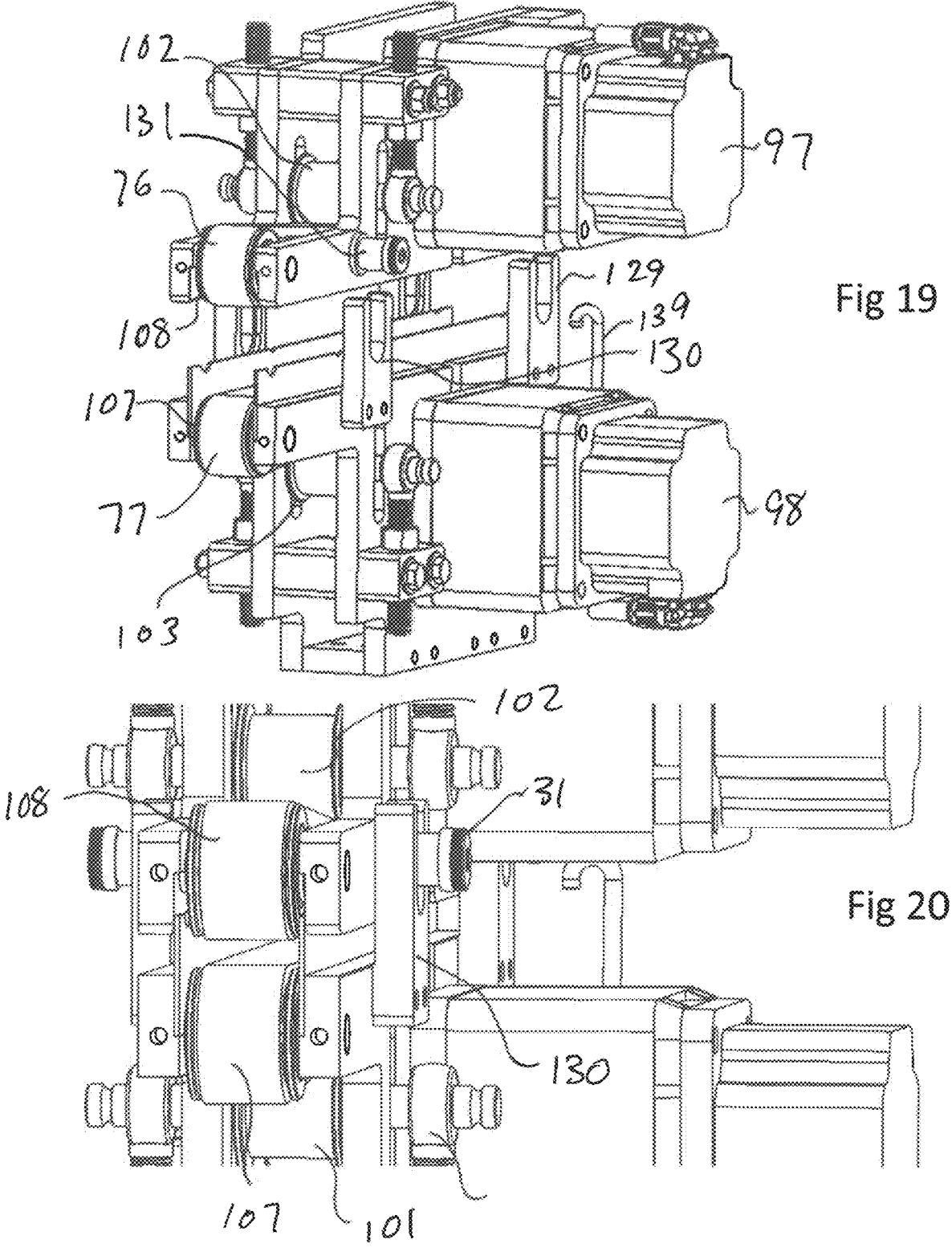
FIG. 19 is an isometric front view of top and bottom stalk pulling assemblies according to the first exemplary embodiment.
FIG. 20 is an isometric front view further illustrating the stalk pulling assemblies of FIG. 19.

The speed of the rotating cutting blades can be controlled with an electrical input to control predetermined or variable speed controls by adjusting the belt or roller pull speeds relative to the rotating speeds of the cutter to optimized the cut of the flower without snatching the flower from the stem. The electrical input to control cutting blade rotation can be provided by a foot switch, optical sensor or mechanical sensor (not shown) that communicates with the motor controller. The motor 78 that drives the cutter can be a belt driven motor, as shown in FIG. 17, or optionally a hub-less motor with a hollow shaft. The conveyor pull belts are extended through the bearing assembly or hub-less motor to minimize the length of the stem needed to engage with the stem to pull it through the cutters. In addition, the rotation of the cutting plates or blades 1,2 can be controlled by a loadcell on the bearing assembly, or an on/off timer that spins the cutting blades 1,2 at a predetermined amount of time after the presence of a stalk 21 is sensed, before the cutting blades 1,2 open again by stopping rotation or slowing the cutting mechanism rotation speed.

Figures 5, 6:
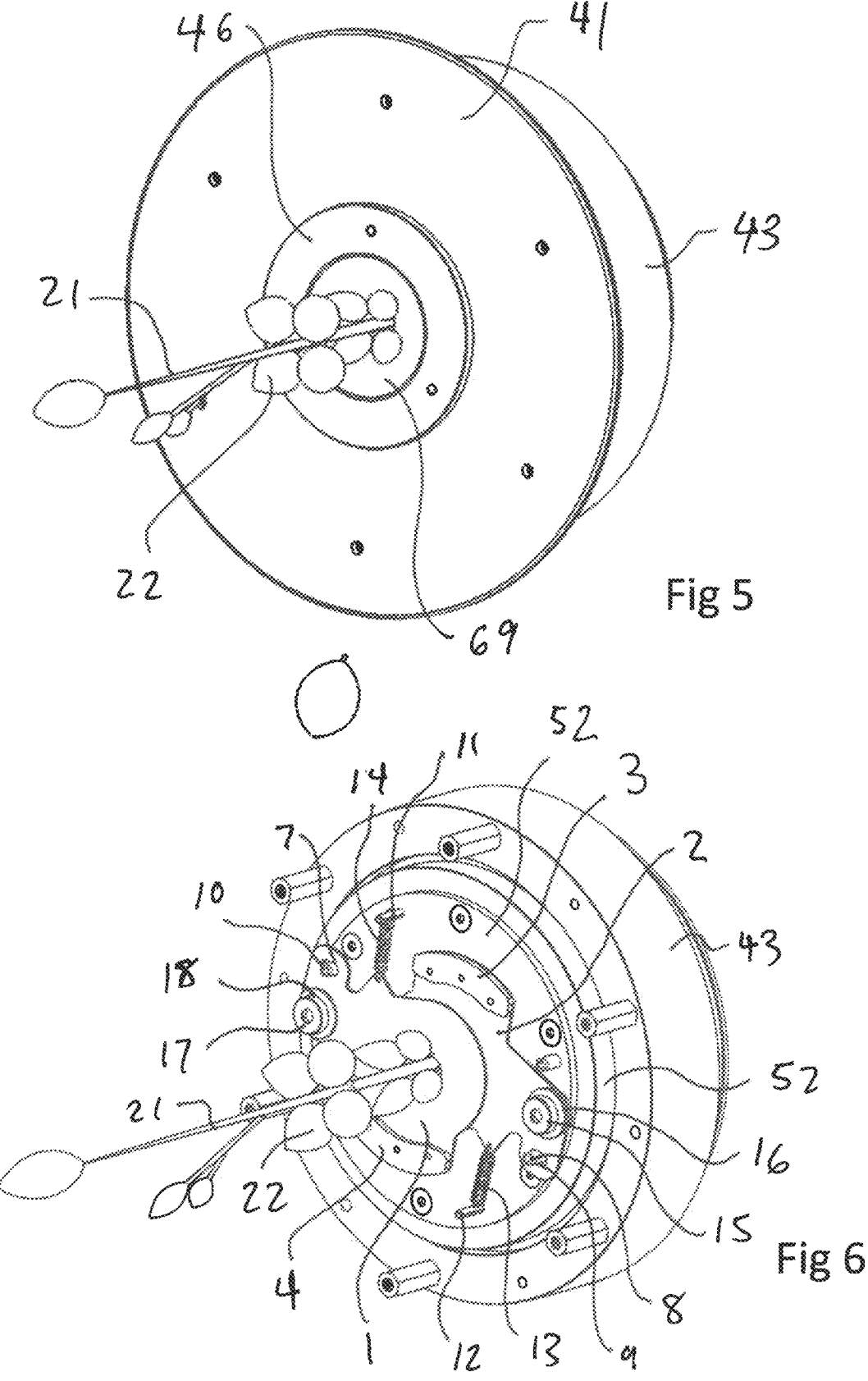
FIG. 5 Is an isometric front view of a cutter and bearing housing that contains the cutting assembly of the first exemplary embodiment.
FIG. 6 is an isometric front view of the housing of FIG. 5 shown with the stationary guard and funnel illustrated in FIG. 5 removed.

It will be appreciated by those skilled in the art that when the stalk 21 is pulled to a position 65*a* at which an apex flower 65 is attached to the stalk, as shown in FIGS. 5 and 6, the iris or opening formed by holes 19,20 in cutting blades 1,2 must pinch the stalk in such a way that the flowers will be cut at the apex where the flower stem meets the stalk. In addition, the edges of the iris or opening must be sufficiently sharp to cut through branches 66 at the point 66a wherein the branches 66 meet the stalk without cutting into the stalk itself. Appropriate pinching and cutting forces can be controlled by controlling the rotating speed of the cutting assembly and the speed at which the stalk 21 is pulled through the cutting assembly.

Figures 7, 8:
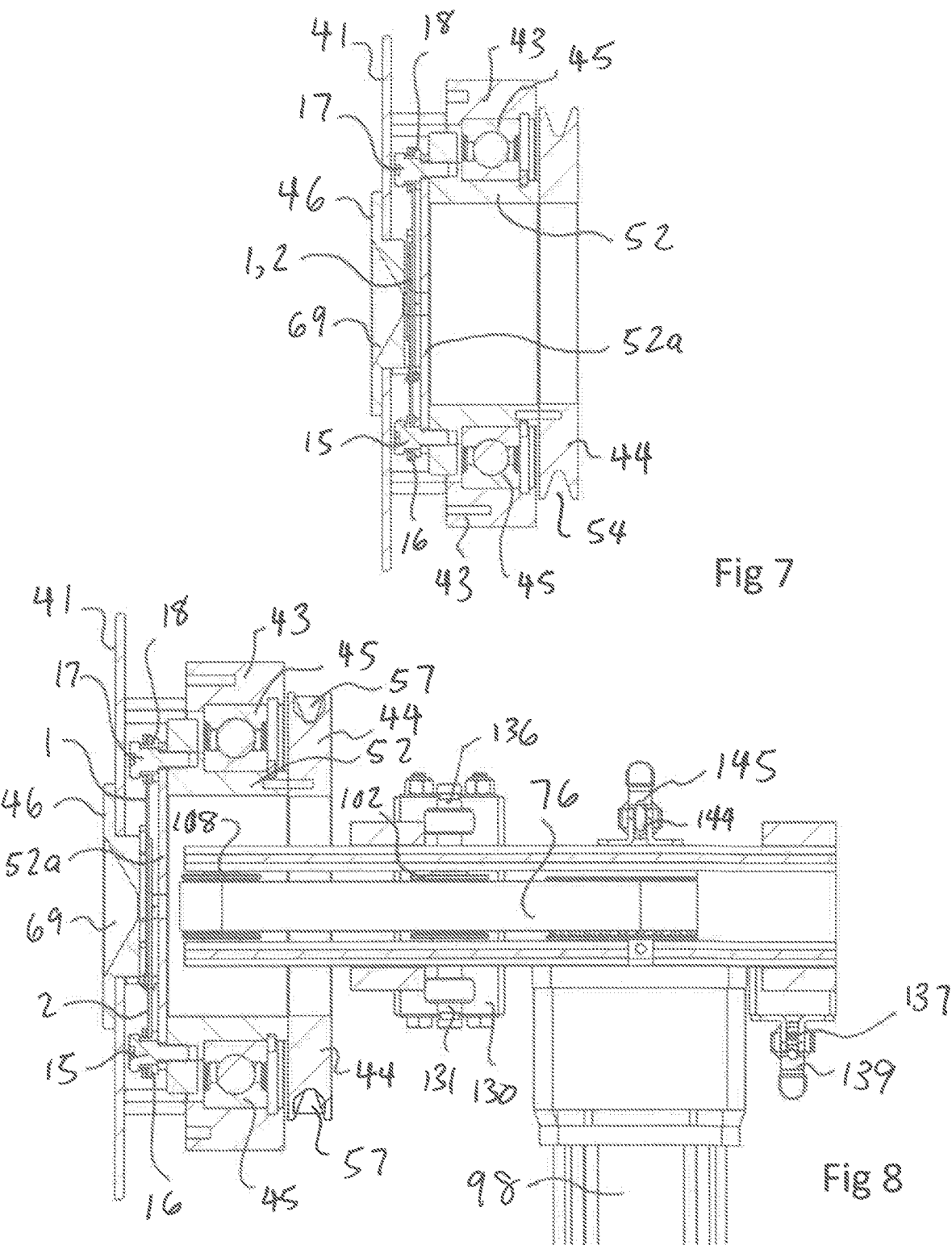
FIG. 7 is a second cut-way side view of the cutting blade assembly of the first exemplary embodiment.
FIG. 8 Is a cut away top view of a cutter assembly and drive belt system according to the first exemplary embodiment.
Figure 9:
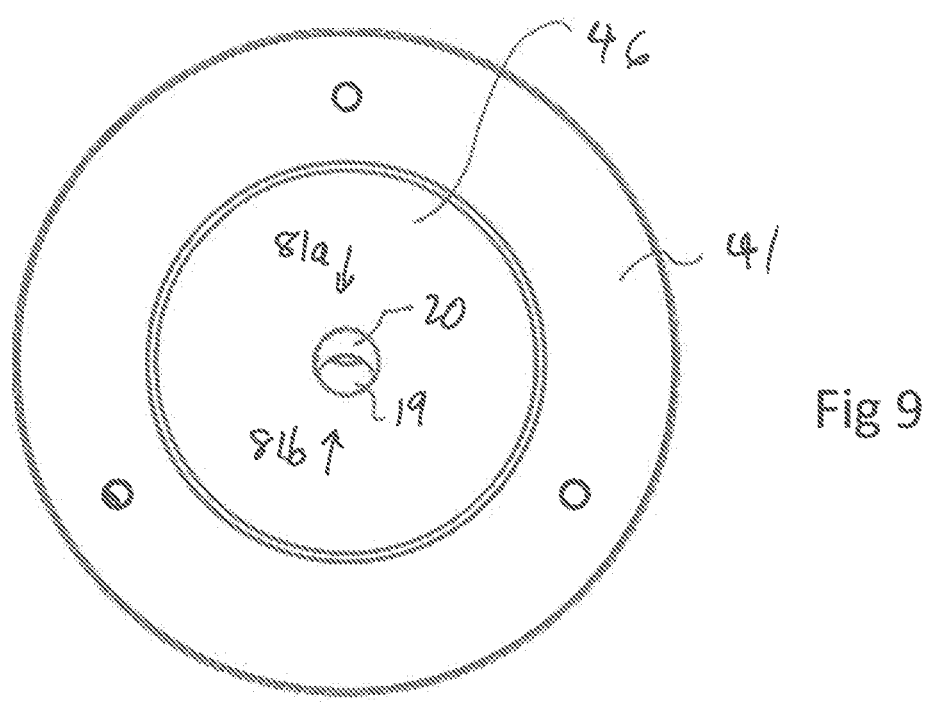
FIG. 9 is a front view showing a funnel and closing top and blades 1,2 according to the first exemplary embodiment.
Figure 10:
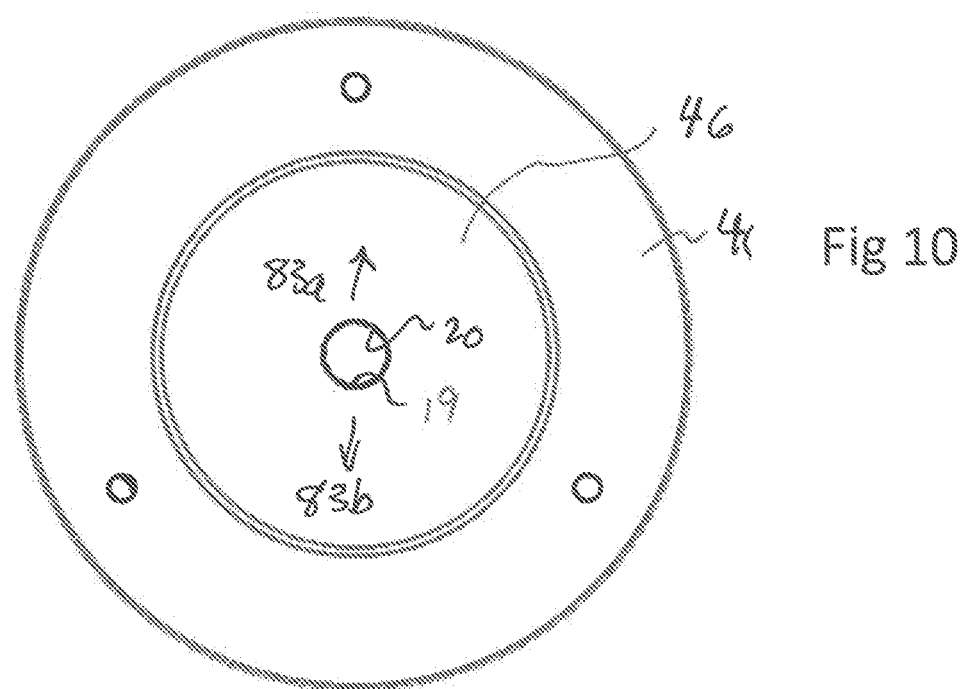
FIG. 10 is a front view corresponding to the front view of FIG. 9 in which the blades 1,2 have been moved to an open position.

As shown in FIG. 8, a stalk-pulling conveyer belt system extends into the rotating hub 52 to pinch and pull the stalk through the iris opening in the cutting assembly. The stalk-pulling conveyor includes a conveyor drive belt assembly 73 inside of the rotating hub 74. A toggle spring tensioner (described below) applies tension to the conveyor belt assembly 73. FIG. 9 shows the funnel 69 with the top cutting blade 20 closing in the direction of 81a and the bottom cutting blade 19 closing in the direction of 81b to create the closing iris scrape blade. FIG. 10 shows the iris in an open position after the blades 1,2 have been moved in the direction of arrows 83a and 83b by the spring force applied 13,14 after the rotational speed of motor 78 has been reduced to reduce the centrifugal force on the cutting blades 1,2.

Figures 11, 12:
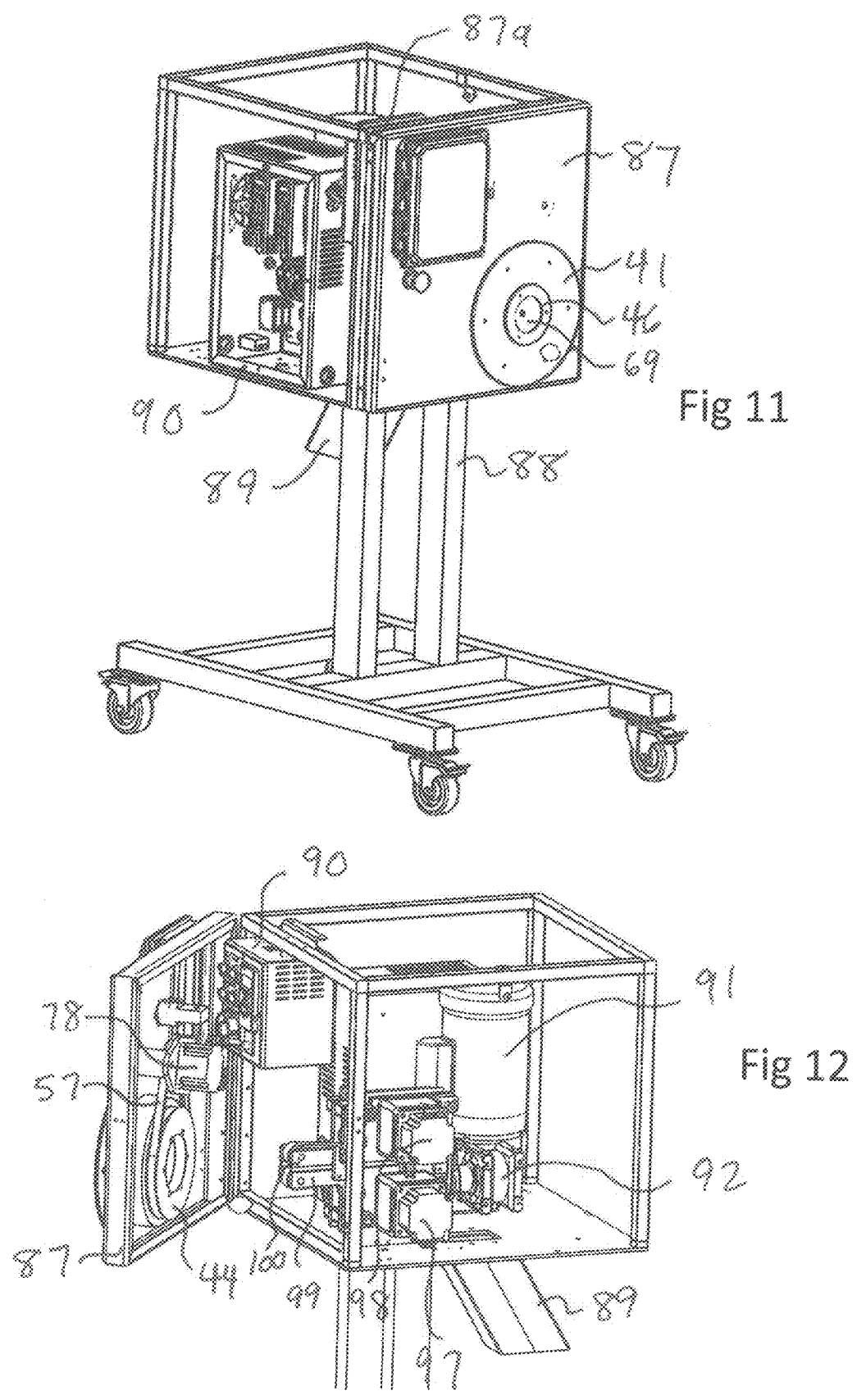
FIG. 11 is an isometric view of a rotating cutting flower harvester that includes the cutting assembly and housing of the first exemplary embodiment of the invention.
FIG. 12 is an isometric view of the flower cutter of FIG. 12 with the door 87 open.

FIGS. 11 and 12 show a complete assembly of the harvester of the exemplary embodiment, which includes the cutting assembly of FIGS. 1-10. The harvester includes a mounting frame 88, discharge chute 89, motor controllers 90d, and a door 87 door with a hinge 78a. The cutting assembly is collectively denoted by reference numeral 86.

In the position shown in FIG. 12, the door 87 is open. The cutter assembly drive motor 78 drives belt 75 to rotate the cutting assembly, as described above. The harvester also includes a discharge stem cutter motor 91 and upper and lower drive belt assemblies 99,100 including stalk pulling drive belts 95,96 and stalk pulling drive belt motors 97,98. Each of the motors is controlled by a controller (not shown) in controller box 90. A biomass waste cutter 92 is provided to cut biomass that has been pulled through the cutting assembly into smaller particles with a rotating blade for discharge through the chute 89 for storage or reduced volume and improved trash removal.

FIG. 13 is a cut-way view of the elongated drive belt assembly 99,100 driven by belt drive motors 97,98 for pulling the stalk through the opening in the cutter assembly. The stalk pulling assembly further includes belt discharge wipers 105,106 for scraping sticky debris from respective belts 76,77, and belt tension adjustors 101,102 for compensating for changes in belt tension due to wear. Also shown in FIG. 13 are a stationary plate 46 which forms the stalk input funnel 69, the belt pinch position 109, and idle pullies 107,108.

Figures 15, 16:
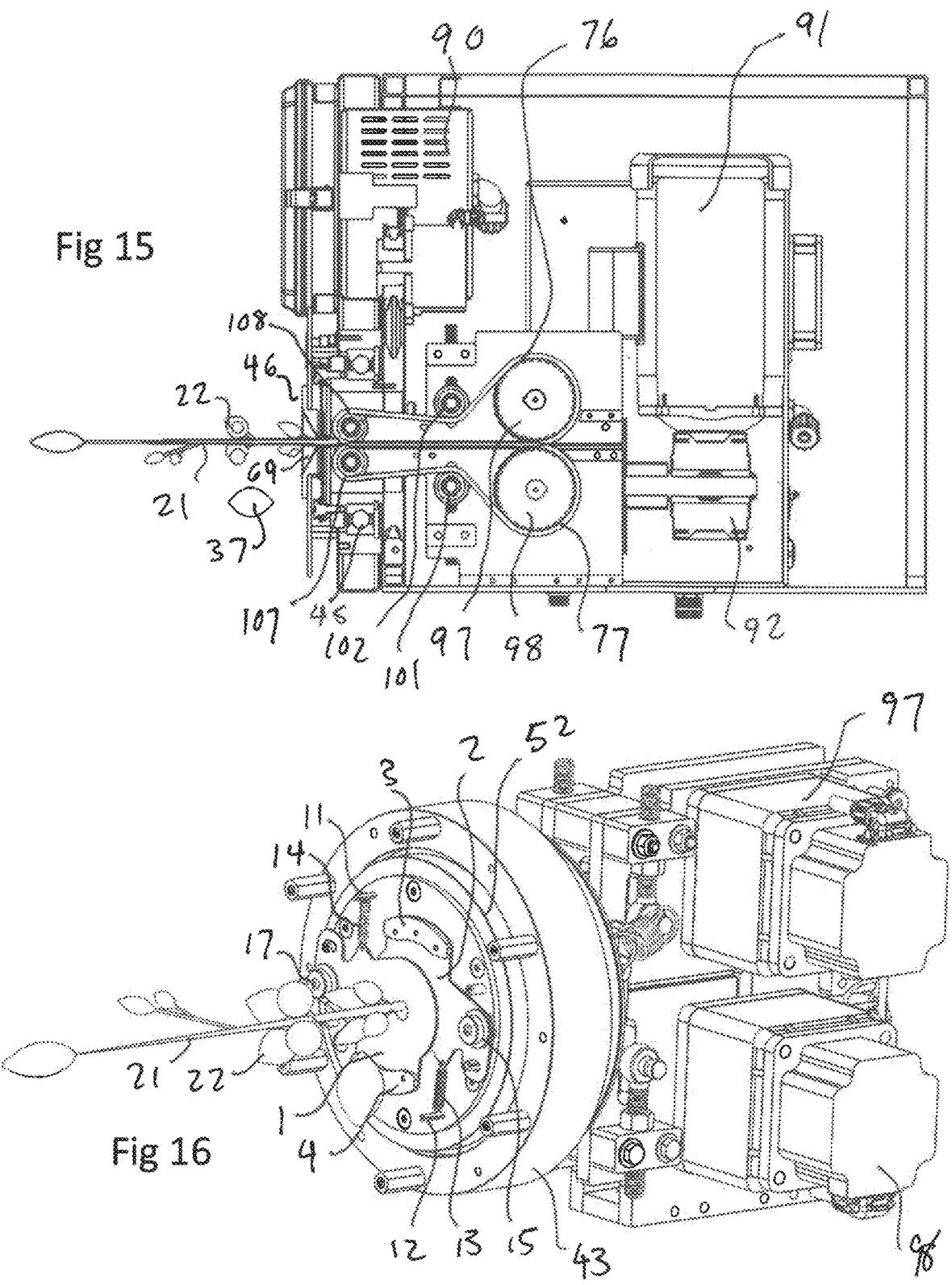
FIG. 15 is a cut away top view of the rotating cutting flower harvester of the exemplary embodiment.
FIG. 16 is an isometric view of the rotating flower cutter and motors without the stationary guard and funnel of the first exemplary embodiment.

FIGS. 14 and 15 show a stem 21 and cut flower 37, at a point where the stem 21 is being pinched between and pulled by the two independent belt assemblies 99,100 through the cutter opening formed by the overlapping blades 1,2. As shown in FIGS. 19-24, one of the belt pulling assemblies 100 is mounted on bearings 131,136 that slide in U-slots 130 fixed to the other belt pulling assembly 99, as shown FIGS. 19,20. The bearings 131 are held in U-shots 130 by springs 137 and toggle clamps 139, shown in FIG. 21, so that the belt pulling assembly 100 floats with respect to the belt-pulling assembly 99 and allows the pinch point between the respective belts to change shape in response to varying thickness of the stalk as it is pulled through the opening in the cutter assembly by the stalk pulling belt drive motors 97,98.

Figures 21, 22:
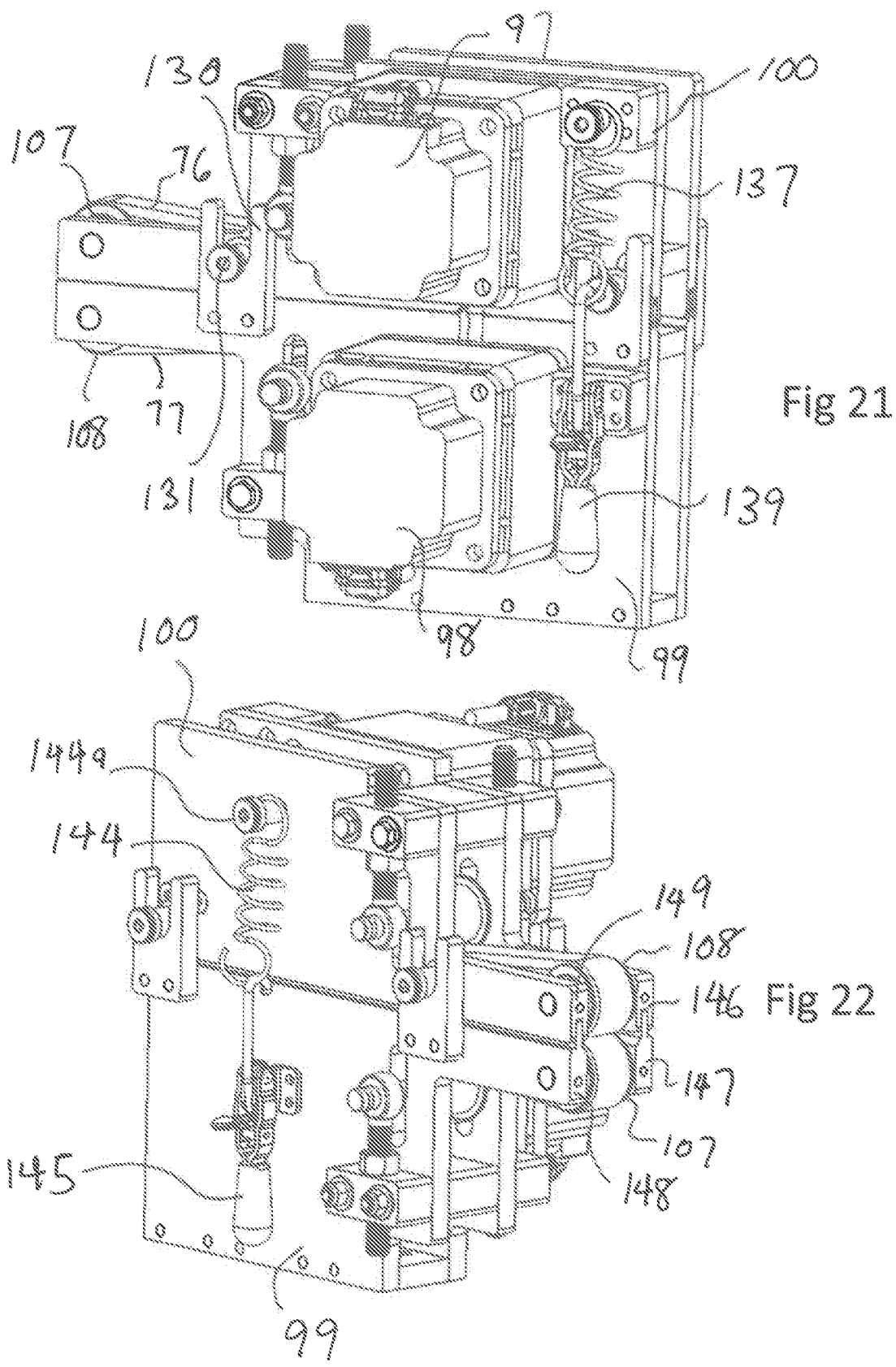
FIG. 21 is an isometric side view of the stalk pulling assemblies of FIGS. 19 and 20.
FIG. 22 is an isometric side view of an opposite side of the stalk pulling assemblies shown in FIG. 21.
Figures 23, 24:
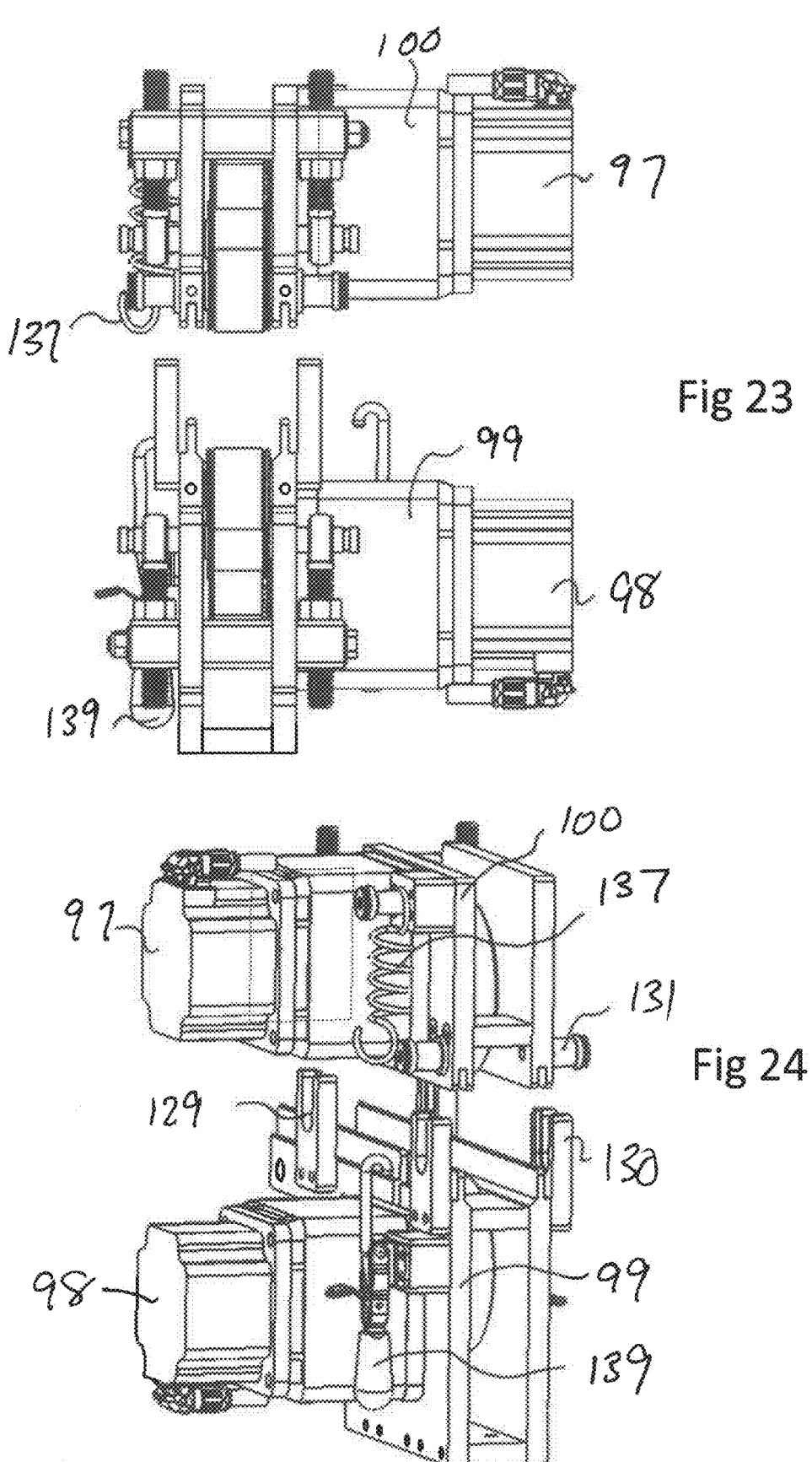
FIG. 23 is a front view of the stalk pulling assemblies of FIGS. 19-22 after removal for cleaning.
FIG. 24 is an isometric view of the removed stalk pulling assemblies of FIG. 23.

FIG. 18 shows a door 126, frame 127 and cover mount 127a. Toggle clamp 139 hooks onto spring 13, as shown in FIG. 21, to releasably couple one side of the two stalk-pulling belt assemblies 99,100. Release of the toggle clamp 139 allows the springs 137 to be unhooked from the toggle clamp to uncouple the stem pulling belt assemblies and allow bearings 131 to be disengaged from U-shaped slots 129,130 and allow the stalk-pulling belt drive assemblies to be separated for cleaning, as shown in FIGS. 23 and 24. Also shown in FIGS. 21 and 22 are a belt slack adjustment idlers 140,141, which can be used to compensate for stretching of the belts with age, and drive belt assembly 142,143 that extend into the rotating hub 52 to pinch and pull a stalk that has just been stripped.

FIG. 22 shows a toggle clamp 145 for releasably coupling the opposite side of the stalk pulling belt assemblies via a tension spring 144 mounted to a post 144a. Additional male and female wipers 148,149 and 146,147 prevent debris from getting between the two drive assembles. In addition, a top and bottom belt puller with male protrusion 152 and mating female groove 150 is provided, as shown in FIG. 23, to prevent debris from getting between the two top and bottom belt stem pullers during harvesting operation.

Figures 25, 26:
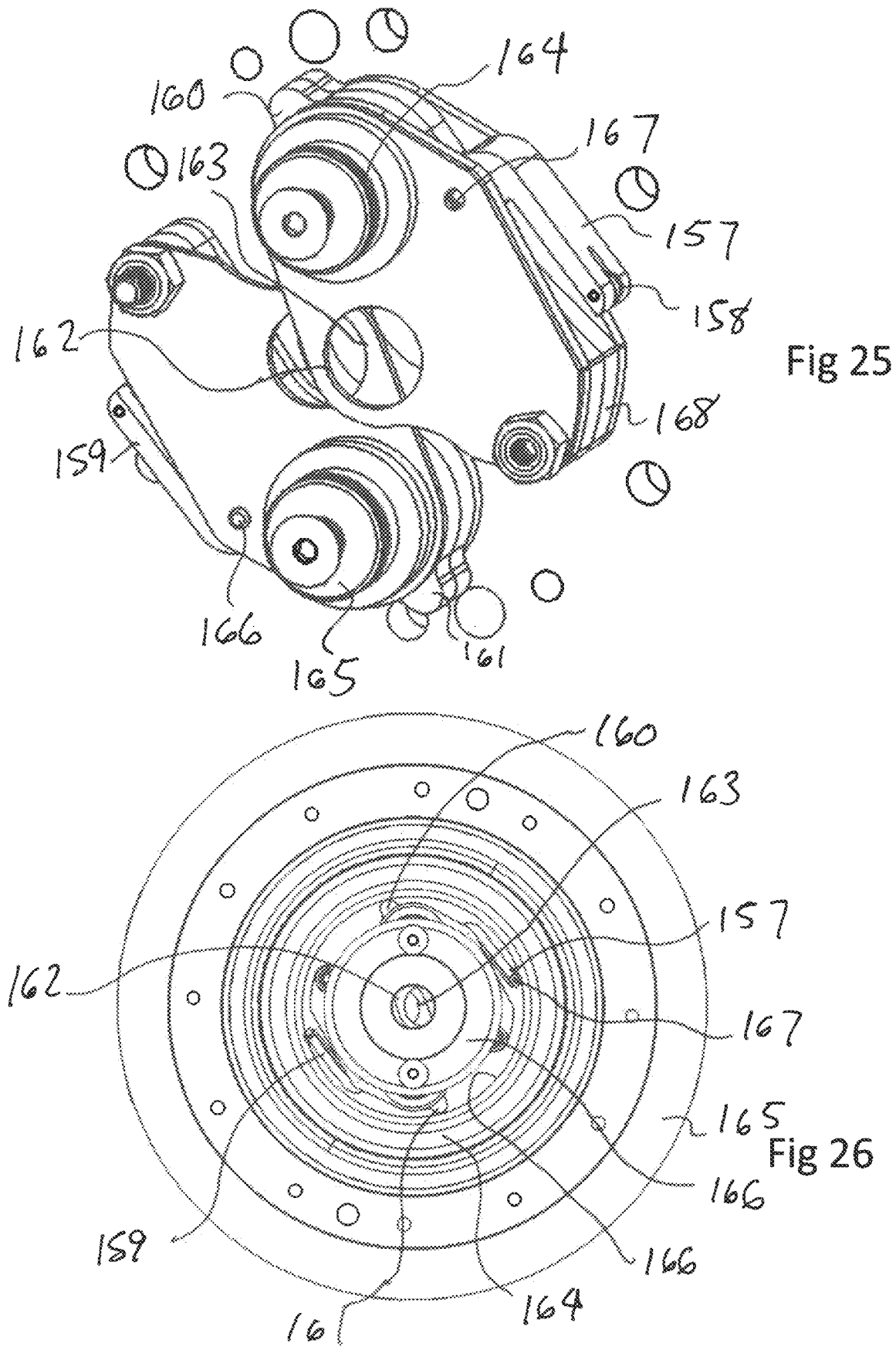
FIG. 25 is an isometric view of cutting assembly according to a second exemplary embodiment of the invention.
FIG. 26 is a front view of a harvester that includes the cutting assembly of FIG. 25.

FIG. 25 shows a second exemplary embodiment of the invention, in which the harvester includes a predetermined stacked weighted cutter with spring loaded return arms 157,159 with wheels 158 to reduce friction. The stacked weights 168 produce enough centrifugal forces to compress a return spring (not shown) when the cutting housing not shown is spinning.

FIG. 26 is a front view of the harvester of the second exemplary embodiment, including a bearing housing 165 and hub 164, with the two cutting blades 1,2 162,164 in FIG. 25. The mechanical stops 160,161 stop against the inner hub 164 that is rotating within the bearing housing 165 that is stationary. The funnel 166 rotates with the blades 1,2.

In both the first and second exemplary embodiments, the precise cutting ability can be adjusted mechanically from the offset of the blade to the edge of the blade follower that is touching the stalk. In each of the exemplary embodiments, the operator of the centrifugal flower cutter may trigger a sensor such as a foot pedal switch or optical switch to send a signal to the motor controller to slow down the blade assembly rotation speed or RPM to a preprogrammed rotation speed or stop. Once the two blade followers have assumed the shape of a hole, the operator or robot arm inserts the stalk into the follower hole. Once the tip of the most significant dimeter end of the branch is inserted, the operator or robot releases the foot pedal or the optical switch changes state to cause the motor controller to increase the rotation speed and capture the stalk between the two or more follower plates or cutting blades, which form the elliptical opening to pinch the stalk. The blade assembly increases the rotation speed that close the pinch follower and align the cutting blade within 0.01 to 0.250 inches from the stalk by the mounting hole spacing between the blade holder and the stalk.

Although a number of embodiments of the invention have been described in detail in connection with the accompanying drawings, it will be appreciated that modifications of the illustrated embodiments may be made without departing from the scope of the invention. For example, the stalk-stripping iris assembly may include an iris follower that includes a fixed plate with a hole and countersink rotating plate rather that the illustrated pivotal top and bottom plates with cutting blades 1,2, each having a circular hole and a bearing surface against which a force is applied to pivot the plates. In addition, the use of centrifugal force may be replaced by a system that using electromagnetic forces to pivot the cutting blades and change the size of the stalk-stripping opening. If the cutting assembly is electromagnetically actuated, the cutter assembly follower's electromagnetic coils can be placed around the spinning non-magnetic housing to activate a steel holder using magnetic forces at the while the cutter assemble is spinning to open or close the follower while the cutter assemblies are spinning. Still further, the belt drive for rotating the cutting assembly may be replaced by a hub-less motor with a hollow shaft.

These and other variations or modifications are intended to be included within the scope of the invention and, as a result, the invention is not to be limited by the above description or the accompanying drawings, but rather is to be defined solely in accordance with the appended claims.

What is claimed is:

1. Apparatus for stripping cannabis flower from a stem, branch, or stalk of a cannabis plant, comprising:

a cutting assembly that includes at least two movable plates that cooperate to form an opening through which the stem, branch, or stalk is pulled, wherein edges of the opening engage the stem, branch, or stalk to cut the cannabis flower from the stem, branch or stalk, wherein movement of the plates in response to a first force in first diametrically opposed direction increases a size of the opening, and wherein movement of the two movable plates in second diametrically opposed directions opposite the first diametrically opposed directions in response to a second force overcomes the first force to decrease the size of the opening until edges of the opening engage the stem, branch or stalk as it is pulled through the opening;

a stalk pulling assembly that includes at least two stalk pulling mechanisms configured to pinch the stalk, stem, or branch and pull the stalk, stem, or branch through the opening, wherein a first of the two stalk pulling mechanisms floats relative to a second of the two mechanisms to enable a spacing between the belts at a pinch point to vary with a diameter of the stalk, stem, or branch, wherein the opening through which the stalk, stem, or branch is pulled is formed by the intersection of overlapping circular holes in the two plates to form an elliptical opening that increases in eccentricity as the plates are moved in said second diametrically opposed directions.

2. The apparatus as claimed in claim 1, wherein the first force is a spring force and the second force is a centrifugal force caused by weights fixed to the plates and rotation of a hub to which the two movable plates are pivotally mounted, movement of the plates in response to the spring and centrifugal forces being limited by movement of posts in respective guide slots.

3. The apparatus as claimed in claim 2, wherein the two movable plates are coupled to the rotating hub by bearings that serve to transmit the rotational motion of the hub to the plates, and that enable the plates to pivot about the bearings by an amount determined by the difference between opposing centrifugal and spring forces as the speed of rotation is varied.

4. The apparatus as claimed in claim 1, wherein edges of said holes include undercuts to increase a sharpness of the edges that engage the stalk, stem, or branch to strip the cannabis flower.

5. The apparatus as claimed in claim 1, wherein the first stalk pulling mechanism is a floating conveyor belt system and the second stalk pulling mechanism is s fixed conveyor belt system, wherein the floating first conveyor belt system includes bearing posts that slide within U-shaped grooves extending transversely to the first conveyor belt, and wherein a steady pinching force is applied by at least one tension spring that couples the two conveyor belt systems.

6. The apparatus as claimed in claim 5, wherein the springs are releasably connected to one of the two conveyor belt systems by toggle clamps that enable the two conveyor belt systems to be separated from each other for cleaning.

7. The apparatus as claimed in claim 5, further comprising wipers that slidably engage the conveyor belts to remove debris from the belts.

8. The apparatus as claimed in claim 5, wherein the two conveyor belt systems include adjustable belt tensioning pulleys to compensate for stretching of the belts with age.

9. The apparatus as claimed in claim 5, further comprising two motors for driving the two conveyor belt systems.

10. The apparatus as claimed in claim 1, further comprising a motor for driving a pulley coupled to the hub to rotate the cutting assembly including the two cutting plates.

11. The apparatus as claimed in claim 10, wherein the motor drives the hub-rotating pulley through a belt.

12. The apparatus as claimed in claim 1, wherein rotation of the cutting assembly is initiated by a mechanical or optical sensor that senses entry of a stalk, stem, or branch into the opening, or by an operator-controlled switch.

13. The apparatus as claimed in claim 1, wherein the cutting assembly is mounted on a door that allows access to both the cutting assembly and the conveyor belts.

* * * * *